Patented Apr. 29, 1924.

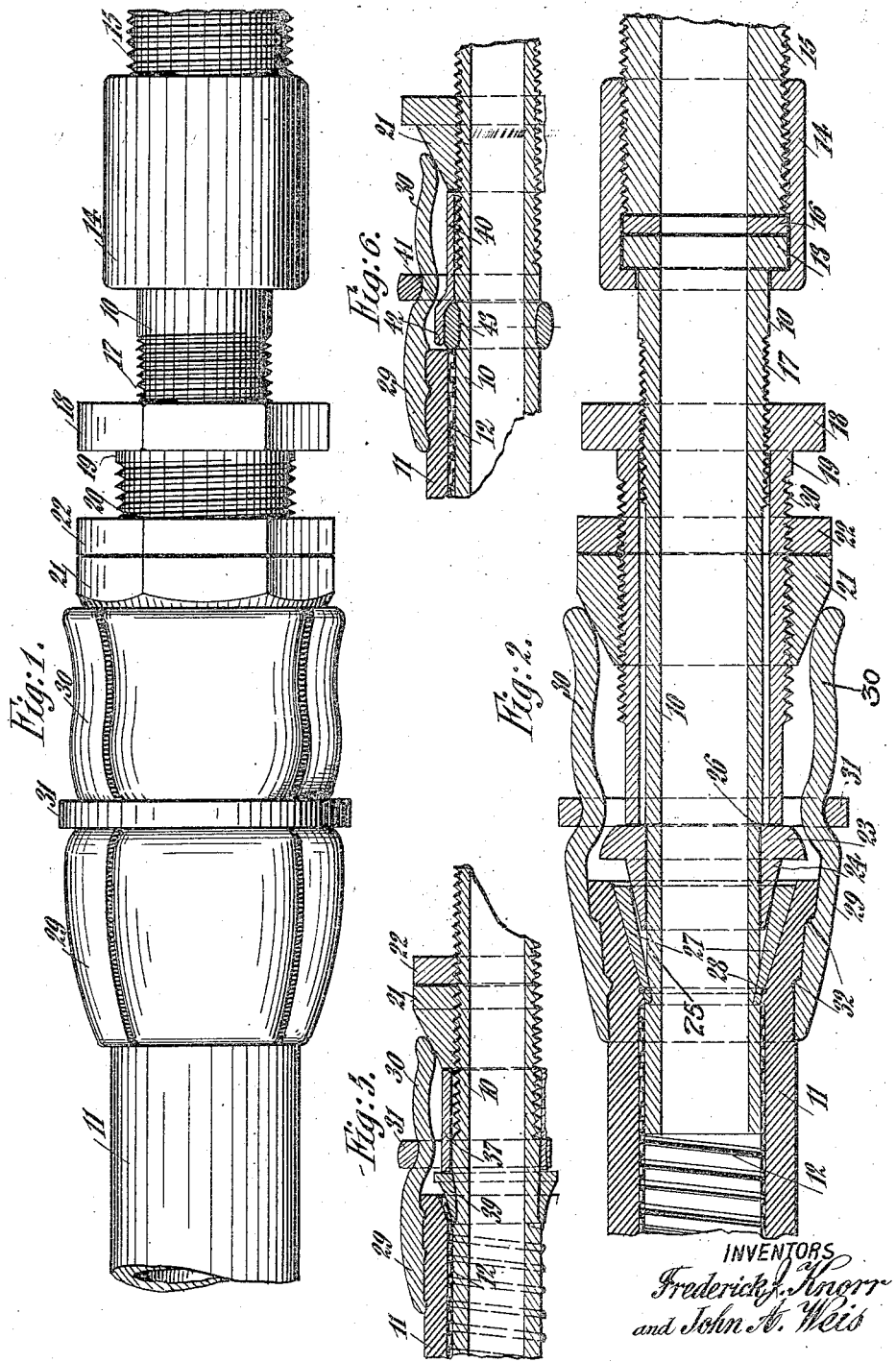

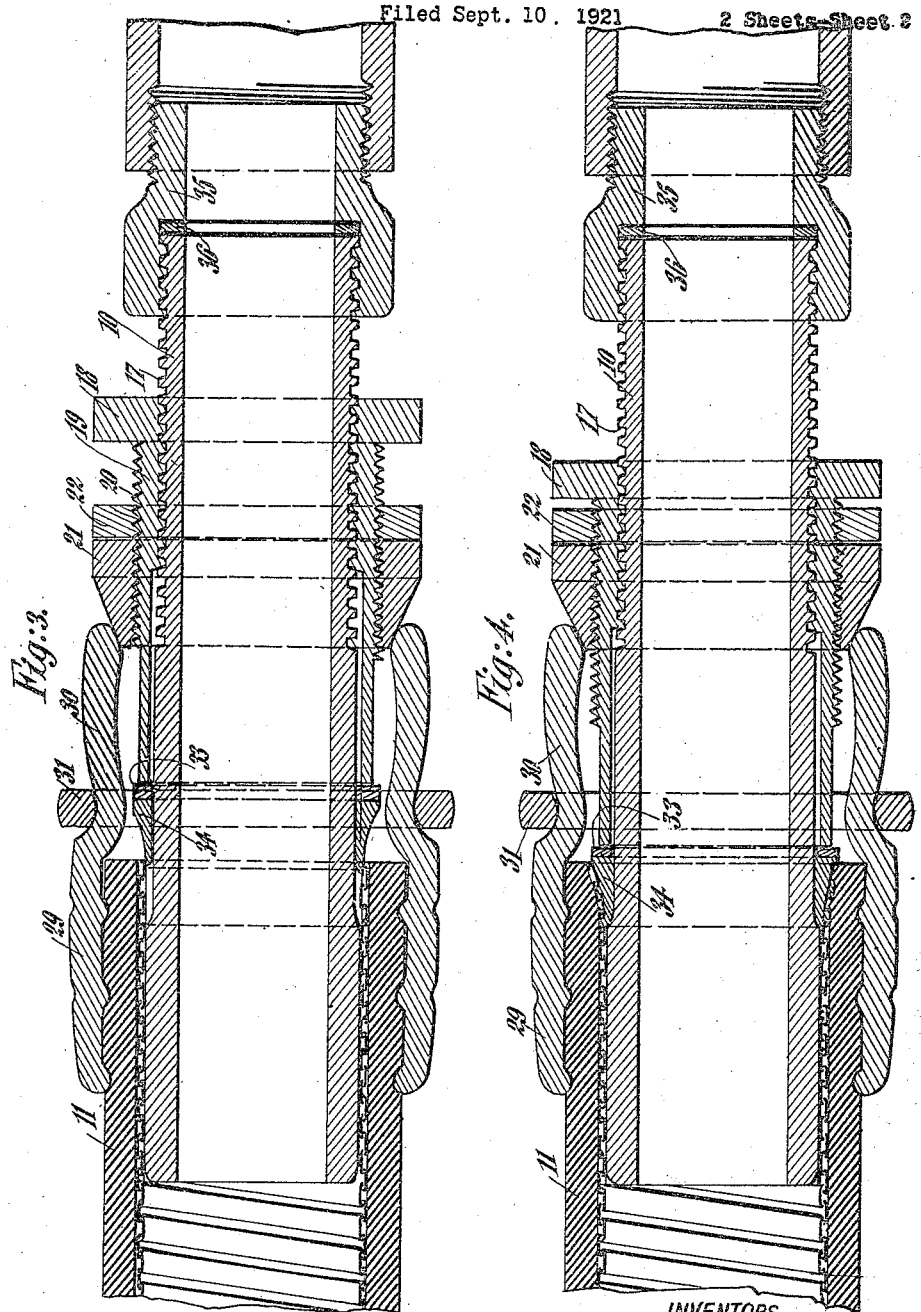

1,491,892

UNITED STATES PATENT OFFICE.

JOHN ARTHUR WEIS, OF NEW YORK, N. Y., AND FREDERICK J. KNORR, OF CARLTON HILL, NEW JERSEY, ASSIGNORS TO UNIVERSAL COUPLING CORPORATION, OF NEW YORK, N. Y., A CORPORATION OF NEW YORK.

COUPLING.

Application filed September 10, 1921. Serial No. 499,755.

*To all whom it may concern:*

Be it known that we, JOHN ARTHUR WEIS and FREDERICK J. KNORR, both citizens of the United States, residing, respectively, in the borough of Manhattan, city, county, and State of New York, and Carlton Hill, county of Bergen, and State of New Jersey, have invented an Improvement in Couplings, of which the following is a specification.

This invention relates to a coupling and more particularly to that type of coupling which is shown and described in copending application, Serial No. 362,076, filed February 28, 1920, by John Arthur Weis, one of the inventors herein, and adapted to be connected to the end of a hose for joining adjacent sections of hose to one another, or a hose section to any suitable outlet. The hose coupling made in accordance with the present invention, like that shown in the application aforesaid, is constructed to engage the outer portion of the hose irrespective of variations in its diameter, and in the present case the invention still more particularly relates to a construction in which the inner section of the hose is also engaged and clamped so as to be adapted for use in connection with metal lined hose and with any type of hose where the hose is to carry an excessive pressure in order to insure an absolutely tight joint between the ends of the hose and the coupling.

In accordance with the present invention, therefore, the construction preferably comprises a pipe section or body member adapted to receive one end of a section of hose together with clamp members adapted to engage the hose exteriorly thereof so as to clamp the same against the body member, and devices for also engaging an inner portion of the hose to clamp the same either between the body member or the clamp members, there being means provided for either separately or simultaneously operating the said clamp members, and interiorly engaging devices for making a tight joint as will be hereinafter more particularly described.

In the drawing:

Fig. 1 is an elevation of a coupling made in accordance with the present invention.

Fig. 2 is a central longitudinal cross section of the same.

Fig. 3 is a central longitudinal cross section of another form of the invention.

Fig. 4 is a view similar to Fig. 3 showing the parts in this form of the invention in a different position.

Fig. 5 is a partial central longitudinal cross section showing another form of the invention, and Fig. 6 is a view similar to Fig. 5 showing still another form of the invention.

Referring to the drawings and particularly to the form of the invention shown in Figs. 1 and 2, the coupling made in accordance with the present invention comprises a tubular pipe or body member 10 adapted at one end to receive a section of hose, that is to fit into the end of the hose so that the outer diameter of the body member is substantially the same as the inner diameter of the hose, and as illustrated in these and other figures of the drawing, the hose is the metallic lined type, the outer fabric or other covering of the hose being indicated at 11, while the inner metallic section of the hose is indicated at 12. The opposite end of the tubular body member 10 as illustrated in these figures is provided with a flange or head 13 adapted to receive a coupling 14 in which there is also received the end 15 of an adjacent section of pipe with an intermediate gasket or washer 16 in order to make a tight joint between these parts.

A portion of the outer surface of the body member 10 adjacent the head end thereof is screw threaded as indicated at 17 to receive a nut 18 which, as illustrated in these figures, is provided with a tubular sleeve extension 19 adapted to extend over a portion of the tubular body member 10 and to lie parallel therewith. A portion of the outer surface of the tubular sleeve extension 19 is screw threaded as indicated at 20 to receive a wedge nut 21 and a lock nut 22. Also on the end of the tubular body member, we provide a collar 23 which, as illustrated in these figures, is provided with a wedge extension 24. This collar 23 and its wedge extension 24 are adapted to fit and slide on the reduced end 25 of the tubular body member 10 and to abut against a shoulder 26 therein to limit and determine the movement in one direction of the collar 23 so as to prevent the collar and its wedge extension from being moved beyond this position in placing the hose on the end of the body member. In this form of the invention also, the lining 12 of the hose is removed for a relatively short distance at the extremity of the hose and the hose is fitted with a cone shaped or wedge packing 27 made of any suitable material, and as illustrated this may be provided adjacent its apex end with a packing ring 28 or band to maintain the inner end of the wedge packing 27 in position.

The members for engaging the outer surface of the hose include a plurality of arms each comprising a body portion 29 and an arm or extension leading therefrom and preferably at an angle thereto. The body member of each of these clamps is indicated at 29 and the arm thereof at 30. Each of these clamp members is provided with a recess in its exterior surface at a position approximately midway of its length and when in place each one of these clamp members fits within a ring 31 which is adapted to lie in the recess in the outer surface of the clamp member. Also as illustrated, the clamp members in the inner surface of the body portion thereof may be provided with ribs or projections 32 for engaging more securely the outer surface of the hose. In this form of the invention, as will now be apparent, after the hose has been fitted to the end of the tubular body member the wedge nut 21 may be turned a predetermined extent to cause the inclined surface thereof to engage the upper portions of the arms 30 to force the body portions of the clamp members into the outer surface of the hose so as to engage the same and fix it in position between these body portions of the clamp members and the tubular body member 10. The nut 18 may then be turned sufficiently to cause the extension sleeve 19 to bear against the collar 23 and force the wedge extension 24 thereof into the conical packing 27 to force the same outwardly and clamp the outer section of the hose between this wedge extension 24 and the conical packing 27 and the body portions 29 of the clamp members. These various parts may be thus moved sufficiently far to insure an absolutely tight joint between the hose and the engaging members of the clamp, it being appreciated that the clamp members may be employed to engage the hose irrespective of its outer diameter and that when the parts are in place the lock nut 22 may be turned down against the wedge nut 21 to secure the same therein. In this form of the invention, as will be understood, the operation of the clamp members to engage the outer portions of the hose is independent of the operation and adjustment of the parts for engaging the inner section of the hose.

Referring to Figs. 3 and 4, it will be seen that we may dispense with the conical or wedge shaped packing member 27 and also with the necessity of removing a portion of the metallic lining of the hose, and in this structure, the collar ring 33 replaces the collar 23, and the wedge member 34 is the equivalent of the wedge extension 24 and is adapted to be forced into the metal lining of the hose to fill the spaces between the same at the extremity thereof so as to make a tight joint. In this structure, as in that shown in Figs. 1 and 2, the clamp members are actuated by the wedge nut 21 so as to engage the outer surface of the hose with the ring 31 acting as a fulcrum and the parts in this position are illustrated in Fig. 3. The nut 22 may then be turned to force the upper extremity of the tubular sleeve extension 19 against the collar or ring 33 which in turn forces the wedge shaped member 34 into the metallic hose lining until the parts assume the position shown in Fig. 4, when, as will be understood, the wedge nut 21 may be further turned, if necessary, and the lock nut 22 caused to secure the parts in position. Also in this form of the invention, the screw threaded end of the body member 10 is adapted to be turned down in the coupling member 35 with an intervening washer or gasket 36 to make a tight joint between these parts.

By reference to Fig. 5, it will also be seen that in this form of the invention, the nut 18 and its tubular sleeve extension 19 may be dispensed with and the wedge nut 21 placed directly on a screw threaded portion of the outer surface of the body member 10 as is illustrated in the copending application to which reference has hereinbefore been made. In this structure, we employ a sleeve member 37 adapted at one end to contact with the inner extremity of the wedge nut and at its other end with the wedge member 39 so that the hose may be clamped both interiorly and exteriorly by the same or simultaneous operation—that is to say, and as will be apparent, when the wedge nut is turned on the screw threaded surface of the body member to engage the arms of the clamps the body portions of the clamps will engage the outer surface of the hose and the wedge nut will force the sleeve 37 against the wedge 39 so as to force the same to position in the metal lining of the hose at the same time the hose is clamped between the body portions of the clamp members and the tubular body member of the coupling.

By reference to Fig. 6, it will furthermore be seen that in some instances instead of forcing the metal lining or the inner portion of the hose outwardly to grip the same between the inner wedge member and the body portions of the clamp members, we may force a suitable packing 43 between the end of the metal lining and the adjacent surface of the body member by a crown 41 the inner end 42 of which then lies adjacent the extremity of the hose, the crown 41 being carried by a sleeve 40 with which it may be integral or otherwise.

While we have herein shown and described various forms of carrying out the invention to grip a hose both exteriorly and interiorly between the parts of a coupling, it will be understood that other equivalent forms may be employed without departing from the nature and spirit of this invention, for example the clamping members might be omitted and their equivalent parts employed, and various forms of inner packing parts might also be used in connection with the devices for forcing them to place.

We claim as our invention:

1. A hose coupling comprising a body member adapted at one end to receive a hose, clamp members adapted to grip the hose exteriorly thereof, and means associated and coacting with the body member for engaging a portion of the inner surface of the hose entirely within a portion of the hose engaged by the said clamps to make a tight joint between the clamp devices, the hose and the body member, and also between a portion of the said means, the end portion of the hose and a part of the said clamp devices.

2. A hose coupling comprising a body member adapted at one end to receive a hose, a plurality of clamp members adapted to grip the hose exteriorly thereof to clamp the same to the said body member, and devices associated and coacting with the said body member for engaging an inner portion of the hose and a portion of the said body member to make a tight joint between the hose and the members of the coupling.

3. A hose coupling comprising a body member adapted at one end to receive a hose, a plurality of clamp members, means for actuating the clamp members, causing the same to engage the exterior of the hose, a clamp member for gripping a portion of the interior of the hose, and means for forcing the last aforesaid clamp member to position between a part of the hose and an adjacent part of the said body member.

4. A hose coupling comprising a body member adapted at one end to receive a hose, a plurality of clamps adapted to engage the hose exteriorly thereof, a clamp member adapted to engage the hose interiorly thereof, and means for simultaneously actuating the said clamp members for forcing the same to place to make a tight joint between the hose and the parts of the coupling.

5. A hose coupling comprising a body member adapted at one end to receive a hose, a plurality of clamp members each adapted to engage a portion of the hose exteriorly thereof, a wedge shaped gripping member associated with the body member and adapted to engage an inner portion of the said hose, and means for simultaneously actuating the said clamp members and the wedge shaped gripping member to force the same to place to make a tight joint between the hose and the parts of the coupling.

6. A hose coupling comprising a body member adapted at one end to receive a hose, a plurality of clamp members, a ring associated with the clamp members, means coacting with the clamp members for forcing the same against outer portions of the hose, a wedge shaped gripping member associated with the body member and adapted to engage an inner section of the hose adjacent the extremity thereof, and means for forcing the said wedge shaped gripping member to position within the hose to make a tight joint between the hose and the parts of the coupling.

7. A hose coupling comprising a body member adapted at one end to receive a hose, a plurality of gripping members each adapted at one end to engage a portion of the outer surface of the hose, a ring through which each of the clamp members passes, a wedge shaped gripping member adapted to engage the inner portion of the hose at the extremity thereof, means carried by the body member for forcing the wedge shaped gripping member to position, and devices carried by the aforesaid means for engaging the opposite ends of the said gripping members for moving the same to position in connection with the hose.

8. A hose coupling comprising a body member adapted at one end to receive a hose, a wedge shaped gripping member carried by the body member and adapted to engage the upper section of the hose adjacent the extremity thereof, a sleeve movable on the body member to force the said wedge shaped gripping member to position between the hose and the adjacent parts of the body member, a plurality of clamp members each adapted at one end to engage a portion of the hose exteriorly thereof, a ring through which the clamp members pass, and means movable on the said sleeve for engaging the said clamp members to force the same to position.

9. A hose coupling comprising a body member adapted at one end to receive a hose, a wedge shaped gripping member carried by the body member and adapted to engage the upper section of the hose adjacent the extremity thereof, a sleeve movable on the body member to force the said wedge shaped gripping member to position between the hose and the adjacent parts of the body member, a plurality of clamp members each adapted at one end to engage a portion of the hose exteriorly thereof, a ring through which the clamp members pass, and a wedge shaped nut movable on the said sleeve and adapted to engage the said clamp members to force the same to position.

Signed by us this 30th day of June, 1921.

JOHN ARTHUR WEIS.
FREDERICK J. KNORR.